United States Patent Office 3,840,521
Patented Oct. 8, 1974

3,840,521
N(6)-DISUBSTITUTED ADENOSINE COMPOUNDS
Erich Fauland, Mannheim-Waldhof, Wolfgang Kampe, Heddesheim, Max Thiel, Mannheim, Harald Stork, Mannheim-Feudenheim, and Egon Roesch, Lampertheim, Germany, assignors to Boehringer Mannheim GmbH, Mannheim, Germany
No Drawing. Filed Sept. 7, 1972, Ser. No. 287,115
Claims priority, application Germany, Sept. 30, 1971, P 21 48 838.0
Int. Cl. C07d 51/54
U.S. Cl. 260—211.5 R     13 Claims

ABSTRACT OF THE DISCLOSURE

Novel N(6)-disubstituted adenosine compounds of the formula

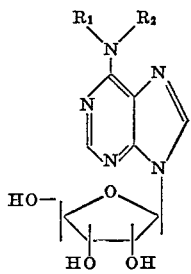

wherein $R_1$ is a straight-chained or branched alkyl radical; and
$R_2$ is a straight-chained or branched alkyl radical containing at least 4 carbon atoms; or a cycloalkyl, cycloalkyl-alkyl or bicycloalkyl radical, which is optionally substituted by at least one alkyl radical;

and the pharmacologically compatible salts thereof; have antilipolytic, anti-hyperlipaemic and anti-hypercholesterolaemic action.

---

The present invention is concerned with novel N(6)-disubstituted adenosine compounds, with therapeutic compositions containing them, and with therapeutic methods using such compounds.

The new N(6)-disubstituted adenosine compounds of the present invention are of the formula:

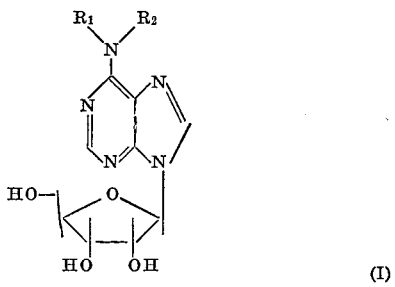

wherein $R_1$ is a straight-chained or branched alkyl radical; and
$R_2$ is a straight-chained or branched alkyl radical containing at least 4 carbon atoms; or a cycloalkyl, cycloalkyl-alkyl or bicycloalkyl radical, which is optionally substituted by at least one alkyl radical;

and the pharmacologically compatible salts thereof.

By the term "alkyl" in the definition of $R_1$, we mean radicals containing, e.g., 1 to 10, preferably 1 to 6, carbon atoms. By the term "alkyl" in the definition of $R_2$, we mean radicals containing, e.g., 4 to 10 carbon atoms, preferably 4 to 7 carbon atoms; by the term "cycloalkyl radical" we mean radicals containing, e.g., 3 to 10 ring atoms and the alkyl moiety of "cycloalkyl-alkyl radical" contains, e.g., 1 to 6, preferably 1 to 4 carbon atoms; by the term "bicycloalkyl radical" we mean radicals containing, e.g., 3 to 10, preferably 5 to 7 ring atoms in each ring, and not more than 13 carbon atoms total in both rings.

We have, surprisingly, found that the compounds of general formula (I) do not possess the cardiac and circulatory action usual for adenosine derivatives but have an anti-lipolytic, anti-hyperlipaemic and anti-hypercholesterolaemic action. The new compounds (I) according to the present invention bring about a considerable reduction of the concentration of free fatty acids, of triglycerides and of cholesterol in the serum. Furthermore, a slight reduction of the blood sugar level is also observed.

The new compounds according to the present invention can be prepared, for example, by reacting a purine riboside of the general formula:

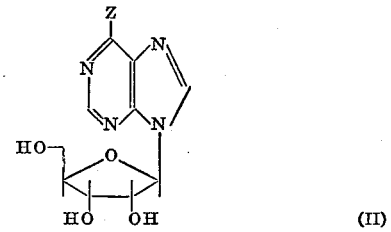

in which Z is a halogen atom or a reactive mercapto group, with an amine of the general formula:

$$R_1\text{—NH—}R_2 \qquad \text{(III)}$$

in which $R_1$ and $R_2$ have the same meanings as above, whereby if desired, the hydroxyl groups of the ribose residue can be temporarily blocked by groups which are easily split off and the compounds (I) obtained are, if desired, subsequently converted into the corresponding salts with acids.

For carrying out the process according to the present invention, the purine ribosides (II) are reacted with the amines (III) in an inert solvent, for example, n-propanol, isopropanol, butanol, tetrahydrofuran or dioxan, preferably in the presence of a tertiary amine, for example, triethylamine, at ambient temperature or at a slightly elevated temperature.

The purine ribosides (II) used as starting materials, in which Z is a halogen atom, are described, for example, in Coll. Czech. Chem. Comm., 30, 1880/1965 and the compounds (II), in which Z is a mercapto group are known, for example, from Chem. Pharm. Bull., 12, 951/1964.

If it is desired temporarily to block the hydroxyl groups of the ribose residue, then there can be used the protective groups conventionally employed in sugar chemistry. For this purpose, there can be used, for example, acyl groups, preferably acetyl or benzoyl radicals, or ketals are employed, for example, the 2′,3′-isopropylidene compounds which, after the condensation reaction has taken place, can easily be converted into the free 2′,3′-hydroxy compounds with acids; however, when acyl radicals are used as protective groups, these are removed by the action of alkalis.

The pharmacologically compatible salts are obtained in the usual manner by neutralization of the free bases (I) with non-toxic inorganic or organic acids, for example, with hydrochloric acid, sulphuric acid, phosphoric acid, hydrobromic acid, acetic acid, lactic acid, citric acid, oxalic acid malic acid, salicylic acid, malonic acid or succinic acid.

The following examples are given for the purpose of illustrating the compounds of the present invention and their preparation:

EXAMPLE 1

Preparation of N(6)-Methyl-N(6)-Cyclohexyl-Adenosine 12.5 g. triacetyl - 6 - chloro - 9 - (β-D-ribofuranosyl)-purine, 5 g. N-methyl-cyclohexylamine and 4.5 ml. triethylamine were heated under reflux for 2 hours in 100 ml. isopropanol. The solution was then evaporated in a vacuum and the residue dissolved in 100 ml. methanol saturated with ammonia, whereafter it was left to stand overnight at ambient temperature. After adding 150 ml. water and leaving to stand for several hours, the crude product separates out in the form of a fine, slightly colored crystalline slurry. This was dissolved in hot ethanol and the alcoholic solution treated with charcoal. After cooling, there are obtained 6.9 g. (63% of theory) N(6)-methyl-N(6)-cyclohexyl adenosine which has a melting point of 143–145° C.

EXAMPLE 2

Preparation of N(6)-Methyl-N(6)-Cyclooctyl-Adenosine 8.2 g. triacetyl - 6 - chloro - 9 - (β - D - ribofuranosyl)-purine, 3.1 g. N-methyl-cyclooctylamine and 4.2 ml. triethylamine were heated under reflux for 5 hours in 100 ml. isopropanol. The solution was then evaporated in a vacuum and the residue was dissolved in benzene and thereafter washed three times with water. The benzene phase was dried and evaporated. The syrupy residue obtained was taken up in methanol and, after the addition of 2 ml. 1N sodium methylate solution, the solution was boiled for 10 minutes. Since upon cooling the solution, nothing crystallizes out, it was again evaporated, the residue was dissolved in ethyl acetate and the ethyl acetate phase extracted with 1N hydrochloric acid. The hydrochloric acid extract was rendered alkaline with ammonia and shaken out three times with ether/ethyl acetate. The organic phase was dried and evaporated. The syrup remaining behind was taken up in a little ethyl acetate and the product precipitated out by the dropwise addition of ligroin. After filtering off with suction and drying there are obtained 4.5 g. (∼57% of theory) of amorphous, chromatographically pure N(6) - methyl - N(6)-cyclooctyladenosine, which sinters at ∼73° C.

EXAMPLE 3

Preparation of N(6)-Methyl-N(6)-Cyclopentyl-Methyl-Adenosine 8.2 g. triacetyl - 6 - chloro - 9 - (β-D-ribofuranosyl)-purine, 3.8 g. N-methyl-cyclopentyl-methylamine and 5.2 ml. triethylamine were boiled for 1 hour. The solution was evaporated in a vacuum, the syrupy residue was taken up in chloroform and the chloroform phase was washed three times with water. After drying over anhydrous sodium sulphate, the chloroform was distilled off and the syrup remaining behind was dissolved in methanol. After the addition of 5 ml. 1N sodium methylate solution, the solution was heated under reflux for a few minutes. The precipitate which separates out upon cooling was filtered off with suction and recrystallized from methanol, with the addition of active charcoal. There were finally obtained 3.8 g. (∼53% of theory) N(6) - methyl - N(6)-cyclopentyl-methyl-adenosine, which has a melting point of 115–116° C.

The following compounds are obtained in an analogous manner:

(a) from triacetyl - 6 - chloro - 9 - (β-D-ribofuranosyl)-purine and N-methyl-cyclopentylamine
 N(6)-methyl-N(6)-cyclopentyl-adenosine;
 m.p. 141–143° C.; 58% of theory;

(b) from triacetyl - 6 - chloro - 9 - (β-D-ribofuranosyl)-purine and N-methyl-trans-4-methyl-cyclohexylamine
 N(6)-ethyl-N(6)-cyclohexyl-adenosine;
 adenosine;
 m.p. 167–168° C.; 47% of theory;

(c) from triacetyl - 6 - chloro - 9 - (β-D-ribofuranoxyl)-purine and N-ethyl-cyclohexylamine
 N(6)-ethyl-N(6)-cyclohexyl-adenosine;
 m.p. 167–169° C.; 66% of theory;

(d) from triacetyl - 6 - chloro - 9 - (β-D-ribofuranosyl)-purine and N-n-propyl-cyclohexylamine
 N(6)-n-propyl-N(6)-cyclohexyl-adenosine;
 m.p. 159–160° C.; 54% of theory;

(e) from triacetyl - 6 - chloro - 9 - (β-D-ribofuranoxyl)-purine and N-methyl-(bicyclo[2.2.1]heptyl-2)adenosine
 N - (6) - methyl - N(6) - (bicyclo[2.2.1.]heptyl-2)-adenosine;
 m.p. 204–206° C.; 51% of theory;

(f) from triacetyl - 6 - chloro - 9 - (β-D-ribofuranosyl)-purine and N-isobutyl-cyclohexylamine
 N(6)-isobutyl-N(6)-cyclohexyl-adenosine;
 amorhpous; 45% of theory;

(g) from triacetyl - 6 - chloro - 9 - (β-D-ribofuranosyl)-purine and N-isobutyl-cyclopentylamine
 N(6)-isobutyl-N(6)-cyclopentyl-adenosine;
 amorphous; 24% of theory;

(h) from triacetyl - 6 - chloro - 9 - (β-D-ribofuranosyl)-purine and N-methyl-cycloheptylamine
 N(6)-methyl-N(6)-cycloheptyl-adenosine;
 m.p. 120–122° C.; 42% of theory;

(i) from triactyl-6-chloro-9-(β-D-ribofuranosyl) - purine and N-n-propyl-cycloheptylamine
 N(6)-n-propyl-N(6)-cycloheptyl-adenosine;
 m.p. 166–167° C.; 29% of theory;

(j) from triacetyl-6-chloro-9-(β-D-ribofuranosyl)-purine and N-isobutyl-cycloheptylamine
 N(6)-isobutyl-N(6)-cycloheptyl-adenosine;
 amorphous, sinters at about 70° C.; 57% of theory;

(k) from triacetyl-6-chloro-9-(β-D-ribofuranosyl)-purine and N-isobutyl-cyclooctylamine
 N(6)-isobutyl-N(6)-cyclooctyl-adenosine;
 amorphous, sinters at about 60° C.; 18% of theory;

(l) from triacetyl-6-chloro-9-(β-D-ribofuranosyl)-purine and N-methyl-isobutylamine
 N(6)-methyl-N(6)-isobutyl-adenosine;
 m.p. 129–131° C.; 73% of theory;

(m) from triacetyl-6-chloro-9-(β-D-ribofuranosyl)-purine and N-methyl-neopentylamine hydrochloride
 N(6)-methyl-N(6)-neopentyl-adenosine;
 m.p. 109–111° C.; 48% of theory;

(n) from triacetyl-6-chloro-9-(β-D-ribofuranosyl)-purine and N-methyl-n-hexylamine hydrochloride
 N(6)-methyl-N(6)-n-hexyl-adenosine;
 m.p. 131–133° C.; 25% of theory;

(o) from triacetyl-6-chloro-9-(β-D-ribofuranosyl)-purine and L-1-cyclohexyl-2-methylaminopropane
 N(6)-methyl-N(6)-(L-1-cyclohexyl-propyl-2)-adenosine;
 m.p. 140–141° C.; 38% of theory;

(p) from triacetyl-6-chloro-9-(β-D-ribofuranosyl)-purine and N-methyl-cyclohexyl-methylamine
 N(6)-methyl-N(6)-cyclohexylmethyl-adenosine;
 m.p. 132–133° C.; 31% of theory;

(q) from triacetyl-6-chloro-9-(β-D-ribofuranosyl)-purine and N-methyl-cyclopropylamine
 N(6)-methyl-N(6)-cyclopropyl-adenosine;
 m.p. 179–181° C.; 57% of theory;

(r) from triacetyl-6-chloro-9-(β-D-ribofuranosyl)-purine and N-methyl-cyclopropyl-methylamine
 N(6)-methyl-N(6)-cyclopropylmethyl-adenosine;
 m.p. 182–183° C.; 48% of theory;

(s) from triacetyl-6-chloro-9-(β-D-ribofuranoxyl)-purine and N-methyl-2-methyl-cyclohexylamine
 N(6)-methyl-N(6)-(2-methyl-cyclohexyl)-adenosine;
 m.p. 148–150° C.; 54% of theory;

(t) from triacetyl-6-chloro-9-(β-D-ribofuranosyl)-purine and diisobutylamine
 N(6)-diisobutyl-adenosine;

amorphous, sinters at about 60° C.; 68% of theory;
(u) from triacetyl-6-chloro-9-(β-D-ribofuranosyl)-purine and N-methyl-pentylamine
N(6)-methyl-N(6)-pentyl-adenosine;
m.p. 130–132° C.; 50% of theory; and
(v) from triacetyl-6-chloro-9-(β-D-ribofuranosyl)-purine and N-methyl-butylamine
N(6)-methyl-N(6)-butyl-adenosine;
m.p. 126–128° C.; 50% of theory.

The compounds of this invention are, as indicated above, useful to decrease serum lipids in mammals. The effectiveness of the instant compounds on the lowering of triglycerides in the blood serum was determined following the procedure of Kreutz and Eggstein, modified by Schmidt et al. (Z. klin. Chem. u. klin. Biochem., 1968, 156–159). The procedure was carried out using for each compound ten healthy male Sprague-Dawley rats, each weighing about 200 g. The animals were kept without food for 16 to 18 hours before application. The compounds were administered intraperitoneally (i.p.) in an aqueous buffered solution. The control group in each instance received only the solvent in the same manner of application. One hour after application of the compounds (or of the solvent alone for establishing the control values) the animals were killed and exsanguinated and in the obtained serum thereof the triglycerides determined enzymatically according to the method of Kreutz and Eggstein, modified by Schmidt et al., supra.

The results are set forth in the following Table 1, expressed as percentage reduction of the triglycerides in the serum of treated animals relative to the control animals.

TABLE 1

| Test compound | Dosage (mg./kg.) | Depression of serum lipids (in percent) |
| --- | --- | --- |
| N(6)-Di-n-propyl-adenosine* | 0.5 | 0 |
| N(6)-methyl-N(6)-cyclohexyl-adenosine | 0.05 | 30 |
| N(6)-methyl-N(6)-cyclopentyl-adenosine | 0.5 | 57 |
| N(6)-methyl-N(6)-(trans-4-methylcyclohexyl)-adenosine | 0.5 | 43 |
| N(6)-ethyl-N(6)-cyclohexyl-adenosine | 0.5 | 63 |
| N(6)-n-propyl-N(6)-cyclohexyl-adenosine | 0.5 | 60 |
| N(6)-methyl-N(6)-(bicyclo[2.2.1]heptyl-2)-adenosine | 0.05 | 40 |
| N(6)-methyl-N(6)-neopentyl-adenosine | 0.1 | 29 |
| N(6)-isobutyl-N(6)-cyclopentyl-adenosine | 0.025 | 50 |
| N(6)-isobutyl-N(6)-cyclohexyl-adenosine | 0.5 | 60 |
| N(6)-n-propyl-N(6)-cycloheptyl-adenosine | 0.5 | 58 |
| N(6)-isobutyl-N(6)-cyclooctyl-adenosine | 0.5 | 37 |
| N(6)-methyl-N(6)-isobutyl-adenosine | 0.05 | 29 |
| N(6)-methyl-N(6)-isobutyl-adenosine | 0.1 | 40 |

*J. Biol. Chem. 242, (1967), p. 3655.

The data in Table 1 show a substantially better effectiveness of the new compounds as compared with the known compound N(6)-di-n-propyl-adenosine; the latter in fact had no effectiveness.

As previously indicated, the adenosine derivatives of this invention are readily adapted to therapeutic use as fat-affecting agents. The toxicity of the compounds of the invention has been found to be quite low or substantially non-existent when they are administered in amounts that are sufficient to achieve the desired therapeutic effect. Moreover, no other pharmacological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragées, powders, aqueous suspensions, solutions, and the like. Such carriers include solid diluents or fillers, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 0.1 to 50 mg. active ingredient per dosage unit. Preferably, the compositions are compounded so that for parenteral administration, 0.5–5 mg. active compound/dosage unit is present and for oral administration 2–10 mg. of compound/dosage unit.

The present invention also includes pharmaceutical compositions in all the conventional forms for oral and parenteral administration, for example, tablets, capsules, dragées, syrups, solutions, suspensions, drops, suppositories and the like. For this purpose, the active material is mixed with a solid or liquid pharmaceutical carrier or diluent and the mixture subsequently brought into the desired form. Examples of solid materials include lactose, mannitol, starch, talc, methyl-cellulose, silicic acid, calcium phosphate, magnesium stearate, agar-agar and gelatine to which, if desired, coloring and/or flavoring materials can be added. Liquid carried materials must be sterile when used for injection solutions and are preferably placed into ampoules.

The precise dosages of compound to be administered to a given patient will depend on a number of factors, but generally a dosage in the range of 0.01 to 20 mg./kg. per day will result in efficacious effects both by the oral and parenteral route, preferably of 0.5 to 5 mg./kg. per day.

It will be understood that the specification and examples are illustrative but not limitative of the present invention and that other embodiments within the spirit and scope of the invention will suggest themselves to those skilled in the art.

What is claimed is:

1. N(6)-disubstituted adenosine compound of the formula

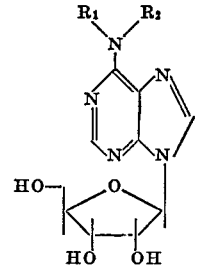

wherein
$R_1$ is alkyl of from 1 to 6 carbon atoms; and
$R_2$ is straight-chained or branched alkyl of from 4 to 10 carbon atoms; cycloalkyl or methylcycloalkyl wherein the cycloalkyl moiety contains from 3 to 10 carbon atoms, cycloalkyl-alkyl with from 3 to 10 carbon atoms in the cycloalkyl group and from 1 to 4 carbon atoms in the alkyl side-chain or bicycloalkyl of from 5 to 7 carbon atoms in each ring;
and the pharmacologically compatible salts thereof.

2. Compound as claimed in claim 1 wherein $R_1$ is methyl.

3. Compound as claimed in claim 2 wherein $R_1$ is ethyl.

4. Compound as claimed in claim 1 wherein $R_2$ is alkyl of from 4 to 10 carbon atoms.

5. Compound as claimed in claim 4 wherein $R_2$ is alkyl of from 4 to 7 carbon atoms.

6. Compound as claimed in claim 1 wherein $R_2$ is cycloalkyl of from 3 to 10 ring carbon atoms.

7. Compound as claimed in claim 1 wherein $R_2$ is cycloalkyl-alkyl of from 3 to 10 carbon atoms in the cycloalkyl moiety and from 1 to 6 carbon atoms in the alkyl moiety.

8. Compound as claimed in claim 1 wherein $R_2$ is bicycloalkyl of from 5 to 7 ring carbon atoms in each ring.

9. Compound as claimed in claim 1 wherein $R_2$ is cycloalkyl-alkyl and said alkyl contains not more than 4 carbon atoms.

10. Compound as claimed in claim 1 designated N(6)-methyl-N(6)-cyclohexyl-adenosine.

11. Compound as claimed in claim 1 designated N(6)-methyl-N(6)-(bicyclo[2.2.1]heptyl-2)-adenosine.

12. Compound as claimed in claim 1 designated N(6)-isobutyl-N(6)-cyclopentyl-adenosine.

13. Compound as claimed in claim 1 designated N(6)-methyl-N(6)-isobutyl-adenosine.

References Cited
UNITED STATES PATENTS

| | | | |
|---|---|---|---|
| 3,225,029 | 12/1965 | Yamaoka | 260—211.5 R |
| 3,590,029 | 6/1971 | Koch et al. | 260—211.5 R |
| 3,706,728 | 12/1972 | Fauland et al. | 260—211.5 R |

JOHNNIE R. BROWN, Primary Examiner

U.S. Cl. X.R.

424—180

UNITED STATES PATENT OFFICE
CERTIFICATE OF CORRECTION

Patent No. 3,840,521      Dated October 8, 1974

Inventor(s) Erich Fauland, Wolfgang Kampe, Max Thiel, Harald Stork and Egon Roesch It is certified that error appears in the above-identified patent and that said Letters Patent are hereby corrected as shown below:

Column 3, line 74, delete      "N(6)-ethyl-N(6)-cyclohexyl-adenosine"

and insert      --N(6)-methyl-N(6)-(trans-4-methyl-cyclohexyl)-adenosine;

Column 3, line 75 delete the word      "adenosine"

which was just repeated.

Column 4, line 18 delete      "amorhpous"

and substitute therefor the correct spelling      --amorphous--.

Signed and sealed this 31st day of December 1974.

(SEAL)
Attest:

McCOY M. GIBSON JR.
Attesting Officer

C. MARSHALL DANN
Commissioner of Patents